United States Patent
Lysen

(10) Patent No.: US 8,571,826 B2
(45) Date of Patent: Oct. 29, 2013

(54) CORRECTION OF IMAGING ERRORS IN ALIGNMENT SYSTEM WITH SEVERAL MEASUREMENT PLANES LOCATED IN SUCCESSION IN THE BEAM PATH

(75) Inventor: Heinrich Lysen, Garching (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 171 days.

(21) Appl. No.: 12/980,929

(22) Filed: Dec. 29, 2010

(65) Prior Publication Data

US 2011/0161033 A1 Jun. 30, 2011

(30) Foreign Application Priority Data

Dec. 29, 2009 (DE) .......................... 10 2009 060 843

(51) Int. Cl.
*G01C 17/38* (2006.01)
(52) U.S. Cl.
USPC ............................ 702/94; 356/490; 356/508
(58) Field of Classification Search
USPC .............. 702/94, 31, 36, 57, 68, 95; 356/508, 356/490
See application file for complete search history.

(56) References Cited

U.S. PATENT DOCUMENTS

| | | | |
|---|---|---|---|
| 6,122,039 A * | 9/2000 | Schumacher | 356/3.07 |
| 6,356,348 B1 | 3/2002 | Lysen et al. | |
| 6,538,691 B1 | 3/2003 | Macy et al. | |
| 2003/0133099 A1* | 7/2003 | Shiode | 356/124 |

FOREIGN PATENT DOCUMENTS

| | | |
|---|---|---|
| DE | 198 22 129 A1 | 11/1999 |
| JP | 62-88904 A | 4/1987 |
| JP | 2000097609 A * | 4/2000 |

OTHER PUBLICATIONS

Machine translation for JP2000097609A.*
German Office Action Corresponds to German Application No. 10 2009 060 843.5.
Thomas Luhmann, Nahbereichs-Photogrammetrie, Herbert Wichmann Verlag, Heidelberg, 2 Auf., 2003, pp. 120 & 352-357.

* cited by examiner

*Primary Examiner* — Jonathan C Teixeira Moffat
*Assistant Examiner* — Eman Alkafawi
(74) *Attorney, Agent, or Firm* — Robert Mlotkowski; Safran & Cole, P.C.; David S. Safran

(57) ABSTRACT

A method for correction of the measured values of optical alignment systems with at least two measurement planes which are located in succession in the beam path. From each measurement plane, the beam path to the light source is transformed back in order to compute new incidence points using a beam which has been corrected by taking into consideration imaging errors.

9 Claims, 1 Drawing Sheet

CORRECTION OF IMAGING ERRORS IN ALIGNMENT SYSTEM WITH SEVERAL MEASUREMENT PLANES LOCATED IN SUCCESSION IN THE BEAM PATH

BACKGROUND OF THE INVENTION

1. Field of the Invention

The invention relates to a method for increasing the accuracy of measurement of alignment systems with several measurement planes which are located in succession in the beam path. The use of at least two measurement planes makes it possible to determine not only the incidence point of a light beam, but also the direction from which this light beam strikes the detector with these measurement planes.

2. Description of Related Art

These measurement systems are known from Patent Application DE 38 14 466 A1 and corresponding U S. Pat. No. 6,356,348 B1. Since hardly any transparent detectors are available for these measurement systems, beam splitters in the form of partially transparent mirrors are used, whose coating is often applied to the diagonal surface of a glass cube. These cubes are formed by cementing two prisms with the cross section of an equilateral-right triangle. These beam splitter cubes are, however, expensive to produce. Therefore, often only a glass plate is partially mirrored. Often, lenses are placed in the housing of the alignment detector. Detectors are photosensitive diodes (PSD) which can be read out one-dimensionally or two-dimensionally. CMOS or CCD-based arrays are also used. Of course, more degrees of freedom of misalignments can be computed with detectors which can be read out two-dimensionally.

However, the accuracy of these measurement systems is limited by systematic imaging errors, especially the aperture aberration and the resulting errors, such as spherical aberration, astigmatism and coma, and by nonsystematic imaging errors, such as reflections on optically active surfaces, production tolerances and shape faults. These imaging errors have an especially serious effect if the light beam does not run near the optical axis of the system, but far away from it, or if the light beam includes an angle relative to the optical axis of the system. If a larger detector is used to be able to measure larger offsets, the effect of imaging errors increases.

SUMMARY OF THE INVENTION

A primary object of this invention is to increase the accuracy of the indicated measurement systems and to reduce the effect of imaging errors.

This object is achieved by a mathematical method for considering systematic imaging errors in the form of an inverse transformation of the light beams from the incidence points on the respective measurement planes back to the light source,. Other configurations of the invention are described below.

Conventional computer programs for computation of the beam paths of optical systems are not suited for achieving this object since they take into account only one image plane.

DETAILED DESCRIPTION OF THE INVENTION

Figure 1:
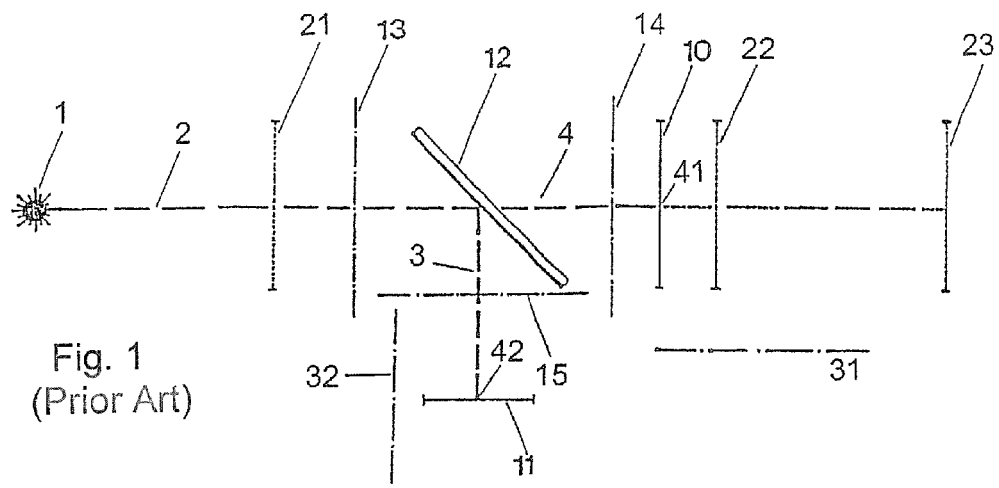
FIG. 1 diagrammatically depicts an arrangement in accordance with the prior art.

The invention is described below using FIGS. 1 and 2. FIG. 1 illustrates the prior art, as is described in Germany Patent DE 38 14 466 and corresponding U.S. Pat. No. 6,356,348, and schematically shows a light source 1 which emits a light beam 2. The light source is often laser diodes or LEDs. This light source is located in a housing which is not shown and which is attached to an object whose alignment state is to be determined. Another housing which also is not shown and in which the two detectors 10 and 11 are mounted in succession in the beam path is attached to another object or elsewhere on the same object. Since hardly any transparent detectors are available, in the beam path, in front of these two detectors, there is a beam splitter mirror 12 from which the advancing beam 4 travels to the detector 10 and the reflected beam 3 is mirror-imaged to the detector 11.

The housing which contains the detectors 10 and 11 is attached to a second object or another part of the same object which has a reference axis 31. A virtual reference axis 32 is formed by the beam splitter mirror 12. The housing which is not shown and which contains the detectors can contain beam-shaping optics 13 comprised of one or more lenses in the vicinity of the entry opening. Downstream of the beam splitter mirror 12 there can be other beam-shaping optics 14 and 15 which likewise comprise lenses or lens systems. Depending on the design of the optics 13 and 15, different virtual positions 21 or 23 of the detector 11 in the path of the light beam can be achieved. These virtual positions, which are produced by the imaging systems, are called measurement planes. Relative to the figures, it is now assumed that the measurement plane 22 is assigned to the detector 10 and the measurement plane 23 is assigned to the detector 11 by the respective imaging optics.

With the pair of detectors 10 and 11, the parallel offset and the angular offset with reference to the reference axis 31 can be determined using the incidence points of the light beams 41 and 42 on the detectors 10 and 11. The representation in FIG. 1 is chosen for an ideal beam path. In reality, of course, it will rarely occur that the incidence points 41 and 42 come to rest exactly in the center of the detectors 10 and 11.

Other beam paths which arise in imperfect alignment run at a distance to the optical axis and at an angle to this axis. The path of this beam is shown in FIG. 2. Here, the light beam 2 runs at a distance from the optical axis. In the optics at the entry opening, this beam is refracted on several surfaces. Therefore, FIG. 2 shows the path of the light beam 2 within the lens system 13 using a broken line. The beam 3, which is shown only symbolically, branches in the beam splitter 12. The beam 4 continues on to the detector 10 and reaches it and its measurement plane 22 at the incidence point 41. When the beam splitter mirror 12 is only a glass plate and not of a beam splitter cube, an offset of the light beam 4 arises relative to the light beam 2, as is shown in FIG. 2. The beam 3 which starts on the beam splitter mirror 12 reaches the detector 11 and its measurement plane 23 at the incidence point 42.

Figure 2:
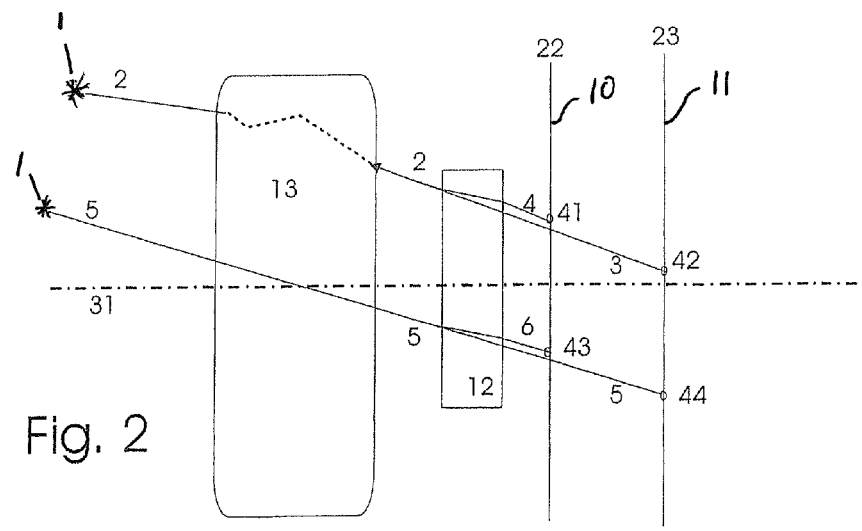
FIG. 2 diagrammatically depicts beam path in an entry optical system of the FIG. 1 arrangement.

Furthermore, FIG. 2 shows a beam 5 which runs through the optical center of the lens system 13. On the beam splitter mirror 12, the beam 5 is reflected and reaches the detector 11 and its measurement plane 23 at the incidence point 44. When a glass plate is used as the beam splitter, the beam 6 runs, likewise, with an offset, on to the detector 10 and its measurement plane 22 and reaches it at the incidence point 43.

At this point, the invention comprises, computing the beam path backwards from the detectors 10 and 11 and the incidence points 41 and 42 of the light beams 2 and 3 determined thereon to the light source 1, of course, Snell's Law applying. From the detector 11, the beam 3 is computed which travels back to the beam splitter mirror 12 through a lens 15 which may be present and which influences only the beam 3. Due to this beam splitter mirror 12 together with optics 15 which may be present, unequal optical conditions of the light beams to the detectors 10 and 11 are also caused. Moreover, the beam path 4 from the detector 10 through the lens 14 to the beam splitter mirror 12 is computed.

Proceeding from the beam splitter mirror 12, the path of the light beam 2 backwards to the light source 1 is now computed for the two light beams 3 and 4. In this further inverse transformation of the incidence points, the path of the light beam from the beam splitter mirror 12 through the entry lens 13 backwards to the light source 1 for the two incidence points 41 and 42 is identical. With this inverse transformation of the beams 2, 3 and 4 to the light source 1, now new incidence points on the detectors 10 and 11 can be computed which differ from the measured incidence points when imaging errors are considered in the inverse transformation.

This inverse transformation does not necessarily proceed from the often used approximation of thin lenses. It was described above that for the beam 3 conditions other than for the path of the beam 2 through the beam splitter mirror to the detector 10 apply. These unequal optical conditions for the path of the beam 3 relative to the further path of the beam 2 after the beam splitter mirror 12 must be considered in the inverse transformation by a common beam being computed from the further path of the beam 2 and in the path the beam 3 and delivering exactly the two incidence points 41 and 42, of course the imaging errors of the lens systems 13, 14 and 15 being considered.

Finally, therefore, from the two beam paths, a common beam path is computed which would yield incidence points other than those actually measured. This change in the location of the incidence points can be attributed to imaging errors. At this point, the measured incidence points can be corrected by the amount which arises due to imaging errors. Thus, the accuracy of the measurement is increased. Together with the distance between the light source and the detector, the alignment between the light source and detector, and the alignment of articles to which the light source and detector are attached is then determined. The accuracy of determining this alignment state is greatly increased by the inverse transformation of two beams in accordance with the invention.

For imperfect beam paths as are shown for the incident beams 2 and 5 in FIG. 2, in the inverse transformation systematic imaging errors must be considered which are caused by the distance of the beams from the optical axis and the angle which this beam includes with the optical axis. Some of these systematic errors are called aperture aberrations.

In an inverse transformation, therefore, the effects of different systematic imaging errors are considered. One of these aperture aberrations is the spherical aberration which occurs in spherical lenses. For light beams which are obliquely incident to the optical axis of the detector housing, the coma must also be included. Likewise, for obliquely incident beams, astigmatism can also be considered. Moreover, image field curvature and distortion can also be considered. In largely monochromatic semiconductor lasers or light emitting diodes, color errors, i.e., chromatic aberrations, conversely play only a minor part. According to the invention, any of these aberrations or any combination thereof may be calculated.

It is decisive for this invention that as many beams are used here as there are detectors and measurement planes; proceeding from the incidence points of the individual light beams on the detectors, for each individual beam, an inverse transformation of the beam path to the light source is performed. With this inverse transformation, it becomes possible to compute the change for the measured incidence points which takes into account the imaging errors.

For many applications, a detector size from roughly 20 to 20 $mm^2$ is no longer sufficient. Therefore, larger detectors are used. Here, it is also necessary to use larger lens systems 13, 14, 15. Thus, the distance of the light beam from the optical axis of the system also increases. Due to these measures, the effects of the above described systematic imaging errors on the determination of the incidence points on the detectors 10 and 11, likewise, become larger. In order to obtain accuracy of determination of the incidence points on the detectors even for larger detectors, it is necessary to compute a correction of the measured incidence points by way of an inverse transformation of the light beam with consideration of the systematic imaging errors. Here, that input beam into the optics which would deliver the x-y values measured there on the two detectors is continuously computed.

If the detector is not an array of CCD or CMOS elements, but a photosensitive diode (PSD), the voltages tapped on this diode are not necessarily linear with reference to the distance of the incidence point of a light beam from one reference point on the surface of this diode, for example, the center point. Therefore, it is feasible to undertake linearization of the measured voltage which corresponds to the location of the incidence point of the light beam after determination of the incidence point on the diode surface. This linearization can be achieved by storing a table of values or by a computation method.

It is especially feasible in large detectors to also include systematic imaging errors in this linearization. Of course, accuracy can be increased in this way even for smaller detectors.

Alternatively, for this linearization only beams near the center can also be considered, as are shown in FIGS. 2 at 4 and 5 when an inverse transformation is carried out.

For beams farther from the center, an additional correction, as is also carried out in linearization, can then take place in the above described inverse transformation.

What is claimed is:

1. Method for the alignment of objects with respect to each other, comprising the steps of:
   directing a light beam of low divergence from a light source arranged on a first object, through an optical system of an alignment device with at least two detectors which are arranged on a second object, the detectors being located in succession in the beam path for determining the incidence points of the light beam on measurement planes of the detectors,
   mathematically transforming the point of incidence of the beam on each measurement plane according to optical rules backwards through the optical system to the light source,
   with the transformation, determining a measurement beam with corrected incidence points on the individual measurement planes, and
   using the corrected incident points for determination of the existence of any misalignment of the objects with respect to each other; and
   correcting the alignment of the objects based on any misalignment of the objects determined to exist.

2. Method in accordance with claim 1, further comprising, in the case of unequal optical conditions, computing a common light beam which reaches the incidence points based on imaging errors from the incidence points which result from a first light beam and at least one other light beam.

3. Method in accordance with claim 1, wherein at least one systematic imaging error backwards through the optical system to the light source is used in said mathematical transforming step.

4. Method in accordance with claim 3, wherein the systematic imaging error is aperture aberration.

5. Method in accordance with claim 3, wherein the systematic imaging error is spherical aberration.

6. Method in accordance with claim 3, wherein the systematic imaging error is coma.

7. Method in accordance with claim 3, wherein the systematic imaging error is astigmatism.

8. Method in accordance with claim 1, wherein linearization of the detectors which form the measurement planes is performed based on at least one systematic imaging error.

9. Method in accordance with claim 1, wherein linearization of the detectors which form the measurement planes is carried out using beams near the center of the detectors.

* * * * *